United States Patent
Platz et al.

(10) Patent No.: US 12,447,544 B2
(45) Date of Patent: Oct. 21, 2025

(54) METHOD FOR PRODUCING A PLATE OF A TURBOMACHINE

(71) Applicant: MTU Aero Engines AG, Munich (DE)

(72) Inventors: Albin Platz, Ried-Baindlkirch (DE); Martin Bussmann, Schwabhausen (DE); Steffen Gerloff, Karlsfeld (DE); Nicole Feiling, Munich (DE); Anna Carina Kuepper, Munich (DE); Norbert Huber, Uberacker (DE); Hermann Klingels, Dachau (DE)

(73) Assignee: MTU Aero Engines AG, Munich (DE)

( * ) Notice: Subject to any disclaimer, the term of this patent is extended or adjusted under 35 U.S.C. 154(b) by 951 days.

(21) Appl. No.: 17/051,997

(22) PCT Filed: May 2, 2019

(86) PCT No.: PCT/DE2019/000120
§ 371 (c)(1),
(2) Date: Oct. 13, 2021

(87) PCT Pub. No.: WO2019/210896
PCT Pub. Date: Nov. 7, 2019

(65) Prior Publication Data
US 2022/0032384 A1 Feb. 3, 2022

(30) Foreign Application Priority Data
May 2, 2018 (DE) .................... 10 2018 206 705.8

(51) Int. Cl.
*B23H 9/10* (2006.01)
*B23H 3/04* (2006.01)
*F01D 5/02* (2006.01)

(52) U.S. Cl.
CPC ............... *B23H 9/10* (2013.01); *B23H 3/04* (2013.01); *F01D 5/02* (2013.01); *F05D 2230/11* (2013.01)

(58) Field of Classification Search
None
See application file for complete search history.

(56) References Cited

U.S. PATENT DOCUMENTS 3,288,699 A * 11/1966 Trager .................. B23H 9/003
204/224 M
6,340,424 B1 1/2002 Elman et al.
2016/0368071 A1 * 12/2016 Lecomte ................... F01D 5/02

FOREIGN PATENT DOCUMENTS

DE 10258920 A1 7/2004
DE 19959593 B4 2/2007
(Continued)

*Primary Examiner* — Louis J Rufo
(74) *Attorney, Agent, or Firm* — Hinckley, Allen & Snyder, LLP; David Josephs

(57) ABSTRACT

The present invention relates to a method for manufacturing a plate of a turbomachine having a plurality of receiving grooves, which are formed on the cylindrical peripheral surface of the plate in order to receive blade roots of blades of the turbomachine. The receiving grooves extend in a straight line from one face of the plate to the other face of the plate, such that a straight line delimits the receiving groove from each point on the cross section of the receiving groove on one of the faces to the corresponding point on the cross section on the other face. A circular plate is provided and a plurality of receiving grooves are introduced into the plate simultaneously on opposing regions relative to a central axis of rotation of the plate.

9 Claims, 2 Drawing Sheets

(56) References Cited

FOREIGN PATENT DOCUMENTS

| DE | 102006015442 A1 | 10/2007 |
| DE | 102007060071 A1 | 6/2009 |
| DE | 102010032326 A1 | 2/2012 |
| DE | 102014111542 A1 | 2/2016 |
| WO | 2014202862 A1 | 12/2014 |
| WO | 2017060651 A1 | 4/2017 |

* cited by examiner

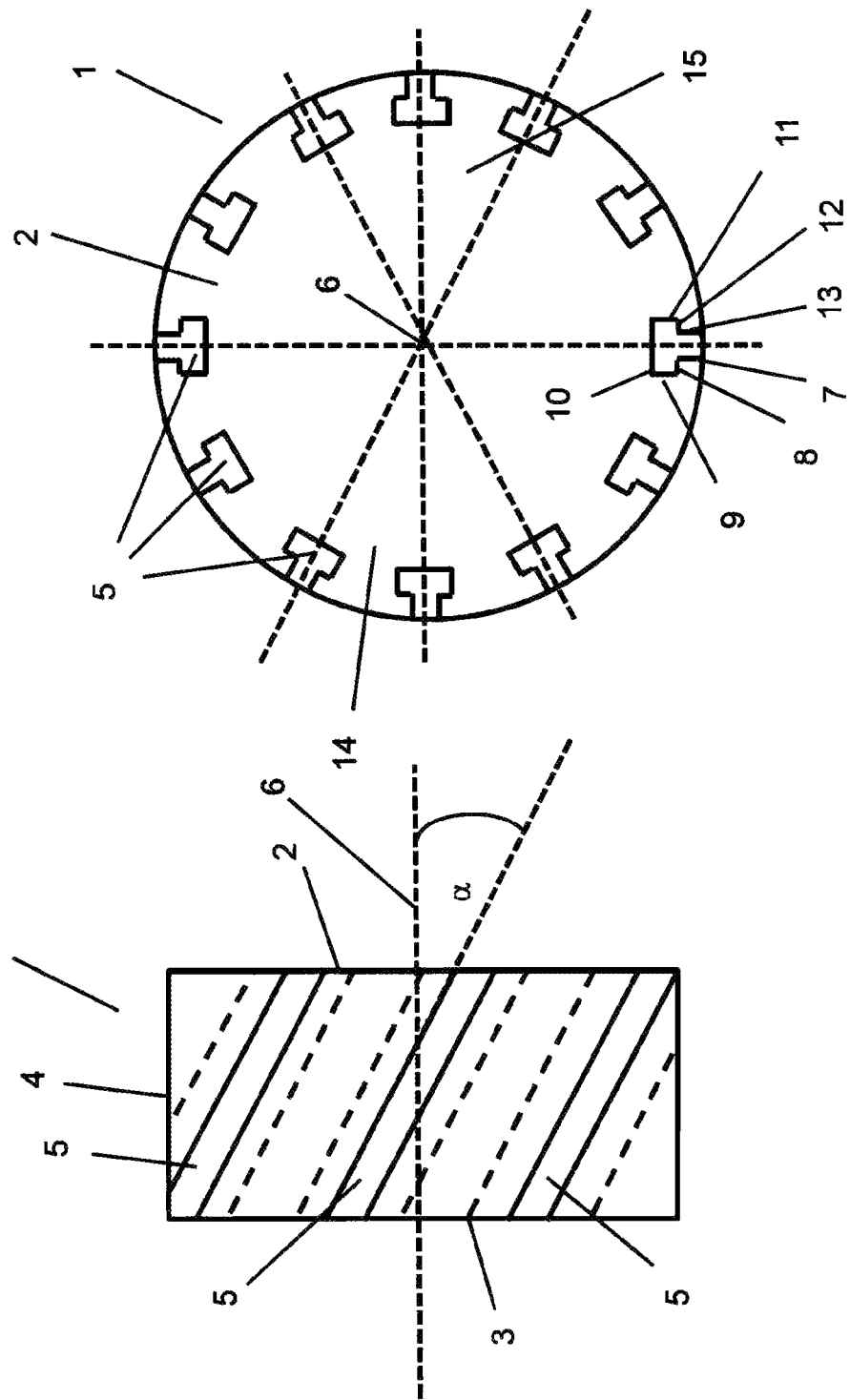

METHOD FOR PRODUCING A PLATE OF A TURBOMACHINE

BACKGROUND OF THE INVENTION

Field of the Invention

The present invention relates to a method for producing a plate, in particular a turbine disk for a turbomachine, such as, for example, for a stationary gas turbine or an aircraft engine.

Prior Art

In turbomachines such as stationary gas turbines or aircraft engines, blades that interact with the through-flowing gas are often arranged in receiving grooves of plates or turbine disks, whereby blade roots of corresponding blades are provided for arrangement in the receiving grooves of the disk. Correspondingly, the receiving grooves and the blade roots of the blades have shapes that are complementary to one another. At the same time, for the secure fastening of the blade roots in the receiving grooves and for the load transfer from the blades to the disk, the receiving grooves and the blade roots may have complex contours, so that the manufacture both of the receiving grooves in the disks as well as the production of blade roots on the blades must satisfy specific requirements, particularly since an exact shaping is also important for preventing stress peaks during operation.

According to the prior art, usually material-removing processing or machining methods, such as, for example, broaching, are used for producing receiving grooves for blade roots in turbine disks. Of course, the corresponding cutting tools such as broaching needles and milling cutters are subject to high wear, since the disks are usually formed of high-temperature resistant wrought alloys, such as nickel-based materials.

In material-removing processing or machining of the turbine disks, the individual receiving grooves for the blade roots are introduced individually, one after another, into the disk, which, on the one hand, causes a long processing time, and, on the other hand, may lead to the circumstance that undesired deformations may occur in the turbine disk due to the release of residual stresses during machining.

Moreover, alternative methods such as wire EDM or electrochemical material processing methods can be used for processing turbine disks. For example, US 2016/036 80 71 A1 discloses a method for producing cavities for a turbomachine disk, whereby blade roots of turbine blades can be inserted into the cavities. In addition, electrochemical processing methods for producing components of turbomachines are known from DE 10 2010 032 326 A1, DE 199 59 593 A1, DE 102 58 920 A1, and U.S. Pat. No. 6,340,424 B1.

Of course, these alternative methods also can be used only to a limited extent for producing receiving grooves in turbine disks, since these methods either cannot, as in US 2016/036 80 71 A1, produce suitable straight-line receiving grooves, or may also require long processing times, and the problem of a possible warping of the disk during the processing also cannot be resolved.

SUMMARY OF THE INVENTION

Object of the Invention

Thus, the object of the present invention is to provide a method for producing receiving grooves in a disk of a turbomachine, by which method an efficient production of a corresponding disk is made possible while simultaneously preventing deviations in shape. In particular, a shaping of the disk that is as exact as possible with a precise arrangement of the receiving grooves will be made possible with the corresponding manufacturing method, while preventing a deformation of the disk or a warping of the disk. In particular, straight-line receiving grooves, as they can also be produced by cutting processes or machining, shall be able to be produced more efficiently than in the prior art.

Technical Solution

This object is achieved by a method of the present invention. Advantageous embodiments are discussed in detail below.

According to the present invention, for the production of straight-line receiving grooves in a disk of a turbomachine, it is proposed to simultaneously introduce a plurality of receiving grooves into the disk, and in fact, into regions that lie opposite one another relative to a central axis of rotation of the disk. Due to the simultaneous introduction of a plurality of receiving grooves into opposing regions of the disk, thus in a type of point-symmetrical arrangement of the receiving grooves to be produced simultaneously relative to the central axis of rotation of the disk, any possible deformation of the disk due to released residual stresses can be limited or can be largely prevented, since the possible deformations can be mutually compensated. At the same time, due to the introduction of the receiving grooves in a manner that is parallel in time, a shortening of the processing time is achieved.

Correspondingly, it is advantageous when as many receiving grooves as possible are introduced simultaneously into the disk. Consequently, a simultaneous introduction of all receiving grooves is advantageous. However, insofar as not all receiving grooves can be introduced at the same time into the disk, it is advantageous if the receiving grooves that are to be introduced simultaneously are arranged uniformly distributed around the circular-shaped periphery of the disk. In particular, the distribution of the receiving grooves in the disk, grooves that can be introduced at the same time, are selected such that a warping of the disk due to residual stresses can be minimized.

A straight-line receiving groove is understood to be a receiving groove that extends along a straight line from one face of the disk to the other face of the disk. In particular, in the case of a straight-line receiving groove, a straight line can be drawn, which delimits the receiving groove correspondingly, from each point of the cross section of the receiving groove in one of the faces to the corresponding point of the cross section in the other face.

The receiving grooves can be introduced into the disk advantageously by electrochemical material processing, and, in particular, at least partially by electrochemical material processing. Due to the at least partial electrochemical material processing, any wear of the tool can be prevented or can be clearly reduced, so that the efficiency of production can be further increased thereby. At the same time, electrochemical material processing offers the advantage that the simultaneous introduction of a plurality of receiving grooves into the disk can be realized in a simple way.

In particular, the receiving grooves can be introduced into the disk by an at least two-step processing, wherein, in particular, the first step of the processing can be carried out by an electrochemical material processing and/or, at least in the first step of the processing, a plurality of, and preferably all of the receiving grooves are produced simultaneously in the disk.

The advantage of a two-step introduction of the receiving grooves into the disk consists in the circumstance that first, the receiving grooves can be introduced in a rough shape in the first step of the processing, so that the contour of the receiving grooves can have a corresponding machining allowance of, for example, 0.1 to 1 mm. Then, only in the second step of the processing can a fine machining with an exact adjustment of the desired shape and/or dimensions of the receiving grooves take place, wherein, also in the second step of the processing, the processing of the receiving grooves can be carried out individually, one after the other.

In particular, the second step or a further step of the processing can be carried out by machining or cutting or by electrochemical material processing. Due to the cutting processing in the second step or a further step of the processing, in particular, materials that comprise carbides or similar materials in their microstructure are processed advantageously with high dimensional accuracy.

If an electrochemical material processing is used in the second step or a further step of the processing, then particularly in this step of the processing, the electrochemical material processing can be carried out with an electrode that has a wedge-shaped operating region at the electrode tip, such that at its electrode tip, the electrode possesses a wedge shape with a tapering in the direction of feed. With such an electrode, a very exact shaping can be achieved at high processing rate, if the electrode is introduced by its electrode tip, for example, into an already preformed receiving groove and is moved linearly through the receiving groove at a relatively high feed rate. For example, the feed rate of the electrode during the electrochemical processing in the first step can be in the range of 0.5 to 5 mm/min, while during the fine machining, the processing speed can lie in the range of 50 mm/min.

In the at least two-step processing of the disk for introducing receiving grooves, portions of individual grooves or each receiving groove also can be processed differently. For example, specific regions of the groove walls can be processed differently. Thus, a portion of the groove walls can be processed only by means of a processing in the first processing step, while the other portion of the groove walls, in particular, load-bearing groove walls, can be subjected to a fine machining in the second step or another processing step.

BRIEF DESCRIPTION OF THE FIGURES

In a purely schematic way, in the appended drawings:

FIG. 1 shows a lateral view of a turbine disk of a turbomachine that has been produced according to the invention;

FIG. 2 shows a view from the top onto a face of the turbine disk of FIG. 1;

DESCRIPTION OF THE INVENTION

Figure 4:
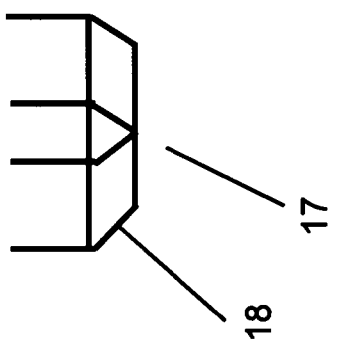
FIG. 4 shows an enlarged representation of the electrode tip of the electrode of FIG. 3.
Figure 3:
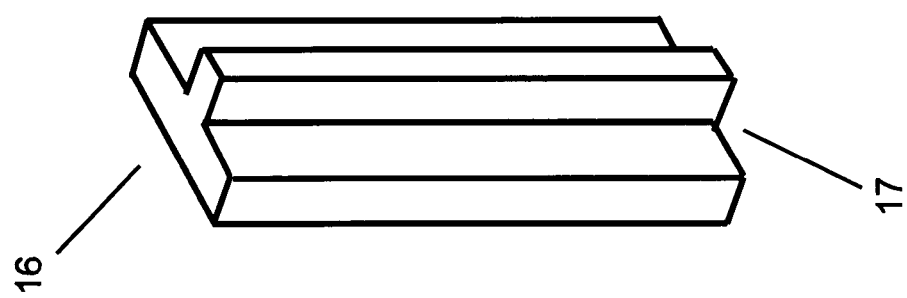
FIG. 3 shows a perspective representation of an electrode for the formation of the receiving grooves in the turbine disk of FIGS. 1 and 2.

Further advantages, characteristics and features of the present invention will be clarified in the following detailed description of the examples of embodiment. Of course, the invention is not limited to these exemplary embodiments.

FIG. 1 shows a turbine disk 1, as it can be produced according to the present invention. The turbine disk 1 has a face 2 and an opposite-lying face 3, each of which is surrounded by a cylindrical peripheral surface 4 and which faces are connected to each other. A plurality of receiving grooves 5 are formed on the peripheral surface 4, and these serve for receiving blade roots of turbine blades (not shown). The receiving grooves 5 each have an expanded receiving space underneath the groove opening at the peripheral surface 5, as can be clearly recognized in FIG. 2 and are indicated by the dashed lines in FIG. 1. As results from the illustration in FIG. 1, the receiving grooves 5 are arranged with their longitudinal axes inclined by the angle α relative to the axis of rotation 6 of the turbine blade 1, which runs perpendicularly through faces 2, 3.

In the top view of FIG. 2 onto one of the faces, 2, it can be recognized that the receiving grooves 5 are arranged distributed uniformly along the circular-shaped periphery of the turbine disk 1 at the peripheral surface 4. The course of the receiving grooves 5 along the peripheral surface 4 is not shown in the figure, for reasons of simplicity. In the exemplary embodiment shown in FIGS. 1 and 2, the cross section of the receiving grooves 5 is hammer-shaped, so that, in addition to a narrow channel that is delimited by the groove walls 7 and 13 and which opens up into the groove opening at the peripheral surface 4, a larger-dimensioned, substantially rectangular receiving region for the blade root is formed underneath the groove opening, and this region is bounded by the groove walls 8, 9, 10, 11 and 12. The shape of the receiving grooves 5, however, is only given by way of example for illustrating the invention. Of course, many other, different, suitable shapes of receiving grooves 5 can be produced in turbine disks 1.

The receiving grooves 5 extend in a straight line along their longitudinal axis, so that the groove walls 7, 8, 9, 10, 11, 12 and 13, which, according to FIG. 2, extend crosswise to the image plane, form planar surfaces, and the edges, each of which delimits two groove walls, are straight lines. Due to the inclined arrangement of the receiving grooves 5 relative to the axis of rotation 6 of the turbine disk 1, the groove walls also run obliquely to the image plane, at least partially.

According to the invention, all of the receiving grooves 5 can be introduced into the turbine disk 1 at the same time, so that any inadmissible deformation of the turbine disk 1 due to asymmetrically occurring residual stresses caused by the introduction of the receiving grooves 5 into the material of the turbine disk 1 is not produced. Even when residual stresses are released in the turbine disk 1 due to the introduction of the receiving grooves 5 or due to the corresponding removal of material, a rotationally symmetrical occurrence of the residual stresses is achieved by the simultaneous introduction of all receiving grooves 5, and a warping of the turbine disk 1 as well as a misalignment of the arrangement of the receiving grooves 5 can be reliably prevented or at least can be reduced.

Insofar as not all receiving grooves 5 will be introduced simultaneously, in each case, the introduction can be carried out in such a way that a plurality of receiving grooves 5 lying opposite to one another will be introduced simultaneously, so that a processing of the turbine disk 1 results that is arranged advantageously as point-symmetrical as possible relative to the axis of rotation 6 of the turbine disk 1. For example, two receiving grooves 5 arranged along a bisecting end lines of the turbine disk 1 can be introduced simultaneously into the turbine disk 1. Alternatively, the two receiving grooves 5 lying in a circle sector 14 between two bisecting end lines can be introduced simultaneously with the corresponding receiving grooves 5 lying in the opposite-lying sector 15. Correspondingly, under certain circumstances, it may be sufficient to introduce the receiving grooves 5 in pairs in each case, whereby each pair of receiving grooves 5 that are introduced simultaneously lie opposite one another relative to the axis of rotation 6 of the turbine disk 1. Preferably, however, all receiving grooves 5 will be worked into the turbine disk 1 at the same time.

Advantageously, the receiving grooves 5 are produced at least partially by electrochemical material processing. For this purpose, electrodes are used that correspond in their outer contour to the inner contour of the receiving grooves 5. By arranging an electrode 16 in the vicinity of the turbine disk 1 corresponding to the position at which the receiving groove 5 will be produced, and by providing a suitable electrolyte in the region of a gap between electrode and turbine disk 1, as well as by applying a suitable voltage between electrode 16 and turbine disk 1, material of the turbine disk 1 can be removed from the turbine disk 1 corresponding to the shape of the electrode 16, so that in the case of a continuous electrochemical material processing with the electrode 16 and the advance of the electrode 16 in the direction of the longitudinal axis of the receiving groove 5 to be produced, the corresponding receiving groove 5 can be worked into the turbine disk 1.

In order to achieve as high an accuracy as possible of the material processing, the electrode 16 can be shaped like a wedge at the electrode tip 17, which is oriented in the direction of the material to be processed, so that the electrode is tapered in the direction onto the electrode tip 17. This is shown once more in greater detail in FIG. 4. FIG. 4 shows the electrode tip 17 as well as the inclined surfaces 18 of the electrode at the electrode tip, which brings about the wedge shape of the electrode 16.

The introduction of the receiving grooves 5 into the turbine disk 1 preferably takes place in a two-step method, whereby, in the first step of the method, the receiving grooves are introduced with a greater tolerance for error, i.e., with dimensions that are smaller than the desired receiving space. Only after introducing a rough shape to the receiving grooves 5 in the turbine disk 1, in a subsequent second step of the processing, is the exact form of the receiving grooves 5 produced within the pre-determined tolerances. After the first step of the processing, the receiving grooves 5 can still have a machining allowance of 0.1 to 1 mm in comparison to the final contour.

In particular, the first step of the processing can take place simultaneously in the way described above for a plurality of or all of the receiving grooves, whereas the fine machining can also take place individually for one receiving groove 5 after another.

Both the first step of the processing of the turbine disk 1 for the production of the receiving grooves 5 as well as the second step of the processing can be carried out by electrochemical material processing. Of course, it is also conceivable that the second step of the processing takes place by machining methods such as, for example, by broaching or grinding, or the like.

In the case of an electrochemical processing both in the first processing step as well as in the second processing step, the feed rate of the electrode in the first step can lie between 0.5 and 5 mm/min, while in the second step, the processing rate can be greater for the fine machining than in the first step and can amount to up to 50 mm/min.

Moreover, it is possible that the receiving grooves 5 being manufactured are processed differently in different regions. Thus, for example, the groove walls 9 and 11 are processed only in a one-step process and the post-processing with the second processing step can be dispensed with for these groove walls; in contrast, each of the remaining groove walls 7, 8, 10, 12 and 13 can be processed with the two-step method.

Although the present invention has been described in detail on the basis of the exemplary embodiments, it is obvious to the person skilled in the art that the invention is not limited to these exemplary embodiments, but rather that modifications are possible in such a way that individual features can be omitted or other types of combinations of features can be realized, without leaving the scope of protection of the appended claims. In particular, the present disclosure encompasses all combinations of the individual features shown in the different examples of embodiment, so that individual features that are described only in connection with one exemplary embodiment can also be used in other exemplary embodiments or combinations of individual features that are not explicitly shown can also be employed.

The invention claimed is:

1. A method for producing a plate or disk of a turbomachine having an axis of rotation and receiving grooves to respectively receive blade roots of the turbomachine, comprising the steps of:
providing a circular disk having a cylindrical peripheral surface, a first face and a second face;
introducing the receiving grooves into the peripheral surface of the disk by two-step processing, having a first step and a second step;
first step processing of pairs of grooves, each of which to extend in a straight line from the first face of the circular disk to the second face of the disk, so that from each point of a cross-section of a receiving groove on the first face to the corresponding point of a cross-section on the second face and wherein a straight line delimits the grooves; and wherein the grooves have a tolerance allowance of 0.1 to 1 mm after the first step of processing; wherein the first step of processing is performed simultaneously for less than all of the of the grooves at a time; wherein less than all of the grooves is a pair of grooves;
second step processing of the grooves previously processed in the first processing step using electrochemical material processing with an electrode having a wedge-shaped region and wherein the wedge shape tapers in the direction of the feed direction, the second step processing further fine processes the grooves to a final contour; the wedge shaped region includes an electrode tip and inclined surfaces at the electrode tip;
wherein the first step and the second step of processing are carried out by electrochemical material processing and a plurality of grooves are simultaneously introduced into the disk at regions located opposite a central axis of rotation of the disk.

2. The method according to claim 1, wherein the at least one pair of receiving grooves are introduced into the disk simultaneously in opposing circle sectors relative to the axis of rotation of the disk.

3. The method according to claim 1, wherein the at least one pair of receiving grooves are introduced into the disk simultaneously, uniformly distributed along the circular, ring-shaped periphery of the disk.

4. The method according to claim 1, wherein the at least one pair of receiving grooves are introduced simultaneously into the disk and are distributed along the circular, ring-shaped periphery of the disk such that a warping of the disk due to residual stresses is minimized.

5. The method according to claim 1, wherein all of the at least one pair of receiving grooves are introduced into the disk simultaneously.

6. The method according to claim 1, wherein the at least one pair of receiving grooves are introduced into the disk at least partially by electrochemical material processing.

7. The method according to claim 1, wherein during the second step of the processing, only portions of the receiving grooves of the at least one pair of receiving grooves are processed.

8. The method according to claim 1, wherein at least the first step of the processing takes place simultaneously for all of the receiving grooves and the first step of the processing takes place by electrochemical material processing.

9. The method of according to claim 1, wherein, in the second step, each groove is separately processed.

* * * * *